(12) United States Patent
Johnson et al.

(10) Patent No.: US 6,879,470 B2
(45) Date of Patent: Apr. 12, 2005

(54) THIN FILM RECORDING HEAD WITH A LOCALIZED COATING TO PROTECT AGAINST CORROSION AND ELECTROSTATIC DISCHARGE

(75) Inventors: Robert A. Johnson, Acton, MA (US); Lawrence G. Neumann, Lancaster, MA (US); James R. Remby, Hopkinton, MA (US)

(73) Assignee: Quantum Corporation, San Jose, CA (US)

( * ) Notice: Subject to any disclaimer, the term of this patent is extended or adjusted under 35 U.S.C. 154(b) by 107 days.

(21) Appl. No.: 10/223,187

(22) Filed: Aug. 19, 2002

(65) Prior Publication Data

US 2004/0032696 A1 Feb. 19, 2004

(51) Int. Cl.[7] .............................................. G11B 5/187
(52) U.S. Cl. ...................................... 360/317; 360/122
(58) Field of Search ................................. 360/122, 317

(56) References Cited

U.S. PATENT DOCUMENTS

| | | | |
|---|---|---|---|
| 4,130,847 A | 12/1978 | Head et al. | |
| 5,544,774 A | * 8/1996 | Gray | ........................... 216/22 |
| 5,617,273 A | 4/1997 | Carr et al. | |
| 5,710,683 A | 1/1998 | Sandaram | |
| 5,772,493 A | 6/1998 | Rottmayer et al. | |
| 5,896,253 A | * 4/1999 | Dirne et al. | ................ 360/122 |
| 5,991,119 A | 11/1999 | Boutaghou et al. | |
| 6,219,205 B1 | 4/2001 | Yuan et al. | |
| 6,359,754 B1 | 3/2002 | Riddering et al. | |
| 6,433,965 B1 | 8/2002 | Gopinathan et al. | |

OTHER PUBLICATIONS

Bhushan, B. et al. (1996). "Pole Tip Recession Studies of Hard Carbon–Coated Thin–Film Tape Heads." *J. Appl. Phys*, vol. 79, No. 8, pp. 5916–5918.

Patton, S. T. & Bhushan, B. (1996). "Micromechanical and Tribological Characterization of Alternate Pole Tip Materials for Magnetic Recording Heads." *Wear*, vol. 202, No. 1, pp. 99–109.

European Search Report mailed on Jan. 15, 2004, for European patent application No. EP 03255071 filed Aug. 7, 2003, 4 pages.

\* cited by examiner

*Primary Examiner*—A. J. Heinz
(74) *Attorney, Agent, or Firm*—Morrison & Foerster LLP

(57) ABSTRACT

A thin film head for use in a tape drive includes a read portion, a write portion, and a giant magnetoresistive (GMR) element disposed in the read portion. The read and write portions have a tape bearing surface. A sensing surface of the GMR element is recessed from the tape bearing surface as a result of a lapping process and coated with a material.

14 Claims, 3 Drawing Sheets

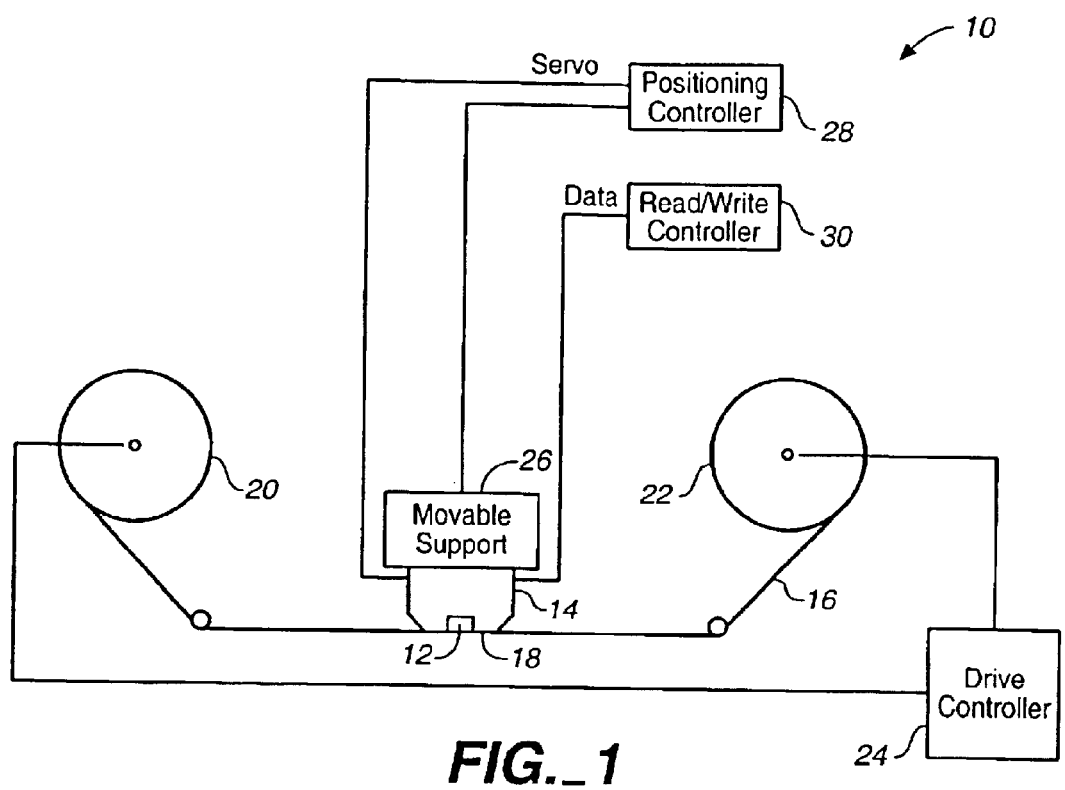
FIG._1

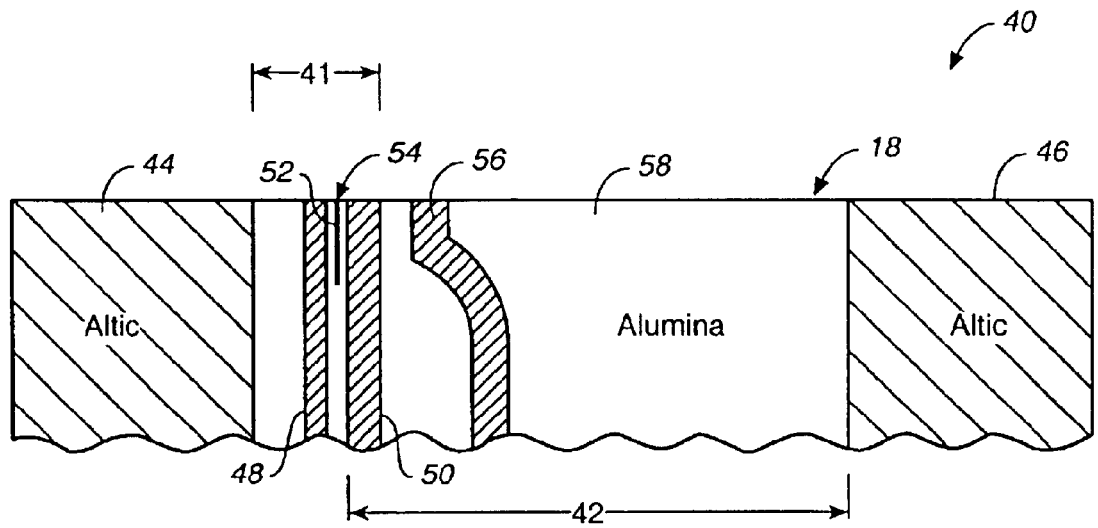
FIG._2
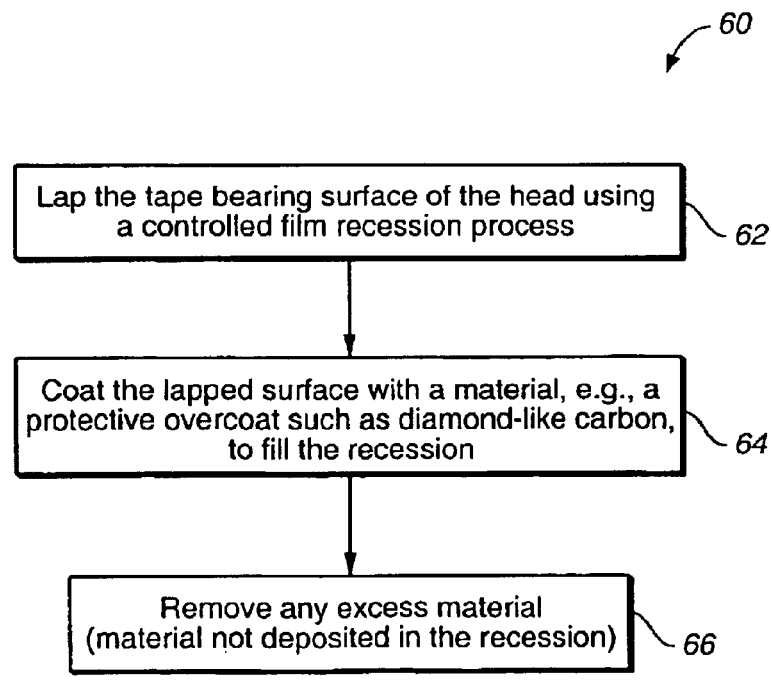
FIG._3

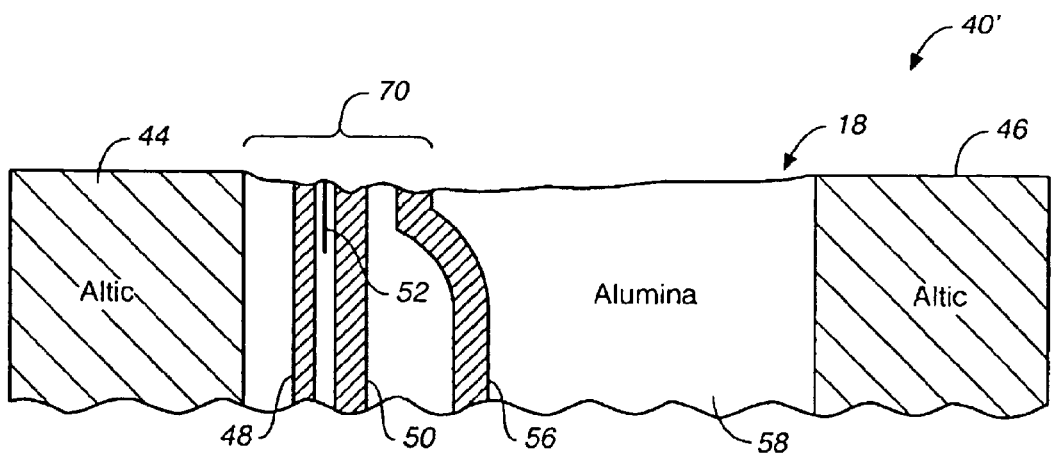
FIG._4A
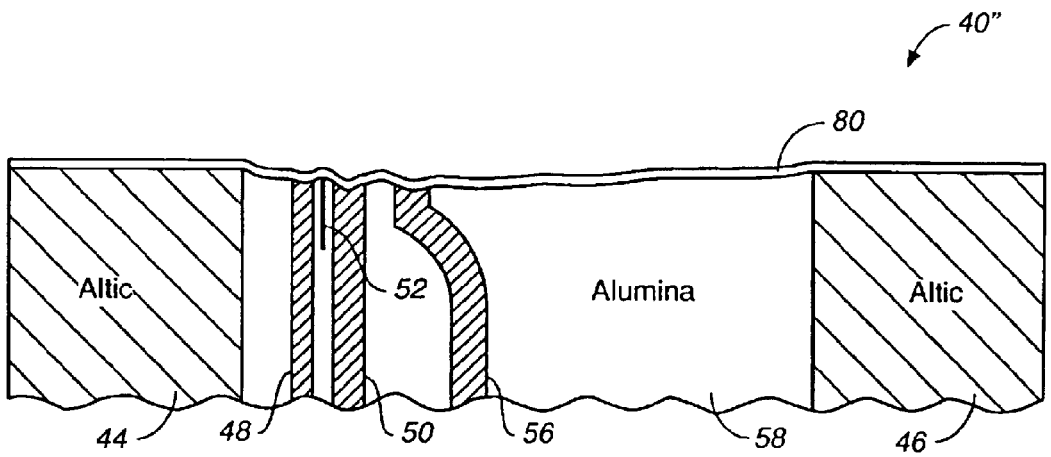
FIG._4B
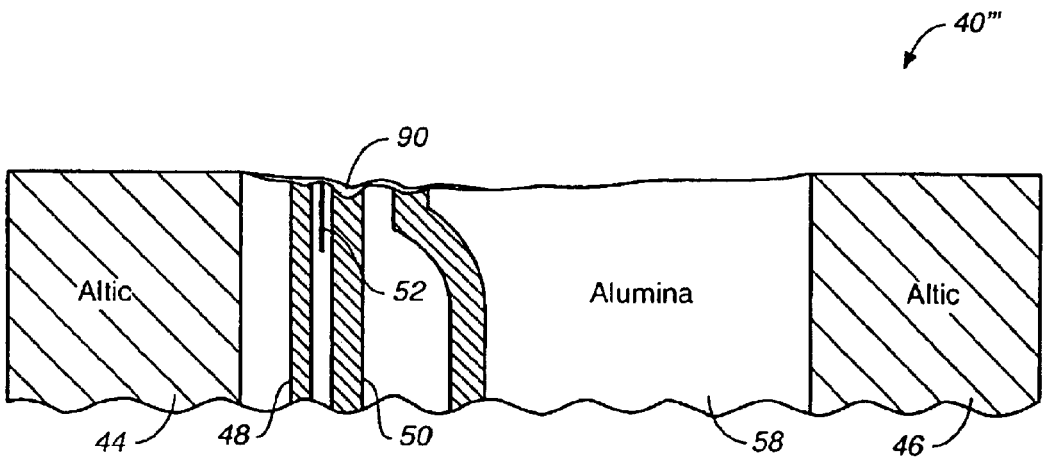
FIG._4C

THIN FILM RECORDING HEAD WITH A LOCALIZED COATING TO PROTECT AGAINST CORROSION AND ELECTROSTATIC DISCHARGE

BACKGROUND

The invention relates generally to data storage systems and, more specifically, to data storage systems having read heads which employ magnetoresistive sensors.

As storage density increases, the magnetic field being sensed during a read by a magnetoresistive sensor in a read head of a data storage system becomes smaller. Thus, there is an ongoing desire to provide improved sensitivity of reads.

One way to improve the performance of a read head is to replace conventional anisotropic magnetoresistive (AMR) sensors with giant magnetoresistive (GMR) sensors, as GMR sensors provide a greater response to a magnetic field in comparison to AMR sensors. The GMR or "spin valve" sensor is characterized by a magnetoresistive (MR) coefficient that is substantially higher than the MR coefficient of an AMR sensor. A GMR sensor is typically a sandwiched structure consisting of two ferromagnetic layers separated by a thin non-ferromagnetic layer. One of the ferromagnetic layers is called the "pinned layer" because it is magnetically pinned or oriented in a fixed and unchanging direction by an adjacent anti-ferromagnetic layer, commonly referred to as the "pinning layer," through anti-ferromagnetic exchange coupling. The other ferromagnetic layer is called the "free" or "unpinned" layer because the magnetization is allowed to rotate in response to the presence of external magnetic fields. When a sense current is applied to the sensor in the presence of a magnetic field such as that provided by a magnetic storage medium, the resistance of the GMR sensor changes resulting in a change in voltage due to the applied sense current. This voltage change may be measured and used to read back information. A GMR sensor fabricated from the appropriate materials provides improved sensitivity and greater change in resistance than observed in AMR sensors. Thus, GMR sensors have become the preferred type of magnetoresistive sensor for data storage systems such as magnetic disk and tape drives.

Certain materials in the GMR sensor that are exposed on the head surface (also known as the air bearing surface or "ABS" with respect to disk drive heads, and the tape bearing surface or "TBS" with respect to tape drive heads) are quite prone to corrosion, making heads which utilize GMR sensors extremely sensitive to corrosion in the environments in which they are expected to operate. Disk drive heads, which operate in a environment sealed at the factory in clean room conditions, are less susceptible to corrosion than tape drive heads, which must operate while exposed to an often quite harsh ambient atmosphere. Also, typically the ABS of the disk drive head is coated with a thin protective film, which is hard and wear resistant on the air bearing surface of a disk drive head. Unfortunately, the nature of tape recording makes the protective overcoat a poor solution for tape drive heads. Tape recording always involves contact between the tape and head, and the surface of the tape is more abrasive than that of a disk. Consequently, a protective film on the GMR sensor wears off in an unacceptable amount of time.

SUMMARY

In one aspect of the invention, a thin film head for use in a tape drive includes a read portion and write portion having a tape bearing surface, a GMR element disposed in the read portion, and a sensing surface of the GMR element recessed from the tape bearing surface as a result of a lapping process and coated with a material.

Embodiments of the invention may include one or more of the following features.

The material can be a magnetic material. The magnetic material can be a plated material.

The read portion can include shields and the write portion can include a write pole. The shields and write pole each can have a surface recessed from the tape bearing surface as a result of the lapping process and be coated with the material that coats the sensing surface of the GMR element. That material can be a diamond-like carbon or, alternatively, a soft magnetic material. The soft magnetic material can be CoZrTa, and the CoZrTa material can be a sputtered material.

In another aspect of the invention, a method of processing a thin film head for use in a tape drive includes lapping a tape bearing surface of the thin film head to produce recessed areas therein, coating at least one of the recessed areas with a material and removing any material in the non-recessed areas.

Embodiments of the invention may include one or more of the following features.

Coating can include coating the lapped tape bearing surface with the material. The material in the recessed areas can form a protective coating for underlying devices in the thin film head.

Particular implementations of the invention may provide one or more of the following advantages. The thin film head is processed in such a way as to allow GMR elements to be used in tape drive heads without the corrosion prone materials such as Cu, and to a lesser degree, CoFe and the AFM exchange materials, being exposed on the TBS. Also, damage from electrostatic discharge (ESD) between the active portion of the GMR element and the tape is prevented.

Other features and advantages of the invention will be apparent from the following detailed description, and from the claims.

BRIEF DESCRIPTION OF THE DRAWINGS

FIG. 1 is simplified diagram of a magnetic tape drive system having a thin film read/write head.

FIG. 2 is a cross-sectional side view of the read/write head.

FIG. 3 is a flow diagram of a method for processing a TBS of the read/write head for enhanced device protection.

FIGS. 4A–4C depict a cross-sectional side view of the read-write head during the various processing stages.

DETAILED DESCRIPTION

Referring to FIG. 1, a magnetic tape drive system 10 includes a read/write head 12 that is mounted on a support 14. A magnetic tape 16 is moved linearly past a planar "tape bearing surface" (or "TBS") 18 of the support 14 and head 12 in either a forward or reverse direction by a pair of reels 20 and 22. A drive controller 24 controls the rotation of the reels 20 and 22 in the forward and reverse directions.

The support 14 is mounted on a movable support 26, which moves transverse to the magnetic tape 16 so that the head 12 can read and write magnetic information signals on the longitudinally moving tape 16. The head 12 can read servo information on the tape so as to keep the head 12 within a desired track. The head 12 provides the servo information to a position controller 28, which processes the servo information and provides head movement signals to the movable support 26. Further, the head 12 is connected to a read/write controller 30, which processes data read from the tape by the head 12 and provides write data to the head 12 for recording on the tape 16.

FIG. 2 is a cross-sectional side view of the head 12 prior to lapping, indicated as head 40. The head 40 includes a read portion (or "reader") 41 and a write portion (or "writer") 42 formed between a substrate 44 and a closure 46. The substrate 44 and closure 46 are made of aluminum oxide titanium carbide ("$Al_2O_3TiC$", referred to as "Altic") or other equivalent material. The read portion 41 employs read devices or structures, including bottom and top (or shared) shields 48 and 50, and a giant magnetoresistive (GMR) element 52 disposed between the shields 48, 50. The GMR element 52 includes a stack of alternating ultra-thin layers of magnetically conductive and nonconductive materials, such as cobalt (Co) and copper (Cu), as known in the art. In response to external magnetic fields, the resistance of the GMR element 52 changes. A sense current conducted through the GMR element 52 causes these resistance changes to be manifested as voltage changes. The voltage changes are then processed by the data control 30 shown in FIG. 1. The element 52 has a sensing surface along the tape bearing surface 18, as indicated by reference numeral 54.

Although the sensing element 52 has been illustrated as a GMR element, it may be any one of a plurality of MR-type sensors, including, but not limited to, top or bottom spin valve GMR, AMR, and SAF GMR. Also, the head could be designed to operate the sensor in a current-in-the-plane (CIP) mode or current-perpendicular-to-the-plane (CPP) mode.

The write portion 42 includes write devices or structures, including the shared shield 50 and a write pole 56. Also included, but not shown, is a write coil structure.

Formed under and over the various devices 48, 50, 54 and 56 during thin film head fabrication are layers of alumina, represented in the figure as a region of alumina 58.

It will be appreciated that, while the illustrated embodiment is a merged head in which a single ferromagnetic layer functions as a shield of the read head and as a bottom (return) write pole structure of the write head, the shared shield layer could be implemented as two separate layers for each of these functions.

Many of the details of the head have been omitted for simplicity. What is of most interest is the tape bearing surface.

Conventional lapping processes are used to lap the tape bearing surface 18 to define stripe height and other head parameters. Typically, during the lapping process, an abrasive grinding surface laps the tips of the write pole 56 and the shields 48, 50, along with the GMR element 52 ("stripe") that is disposed between the shields until the desired stripe height is achieved. Because the GMR element is lapped simultaneously with the write pole and shields, it is left exposed to long term corrosion and other damaging effects, e.g., those associated with electrostatic discharge (ESD). Some of the GMR element layers, such as copper, are quite prone to corrosion. Also, the conventional lapping/grinding process involves materials that have a different hardness from each other. For example, and as noted earlier, the head 12 is composed of a composite material that includes Altic, a protective/insulation film such as alumina ($Al_2O_3$), and a metallic magnetic material such as permalloy (FeNi), Sen-dust (FeAlSi) and the like. For example, the substrate and closure are made of Altic, as noted earlier, the region 58 is alumina, the bottom and shared shields 48, 50 may be permalloy or Sendust (or the like), the write pole 56 made of permalloy or the like, and the GMR element, as discussed earlier, includes such metals as Co and Cu. When a conventional free abrasive slurry is used for grinding of the TBS of the thin film head 12, stepped or rough surface results due to selective grinding or abrasion of the soft metallic materials such as permalloy, Sendust and the GMR materials, and alumina, due to difference in hardness between those materials, that is, between the device materials and the alumina, as well as between the device and alumina materials and the harder material such as Altic. As a result, there is a problem in that the metallic device materials (and to a lesser extent, the alumina) are recessed from the TBS composed of the Altic. This phenomenon is known as Pole Tip Recession (or "PTR"). In general, the spacing between the TBS and the head, in particular, the read and write devices, must be as small as possible to ensure maximum tape head performance. Thus, because recession increases the spacing between the read/write devices and the recording medium, it is viewed unfavorably.

Much work has gone into developing ways to control the amount of recession that occurs during lapping of materials of various hardnesses. In the field of head technology, for the spacing issue discussed above, the goal has been to eliminate recession, that is bring the recession value as close to zero as possible without going positive direction (pole tip protrusion).

Techniques include, for example, adding lubricants such as anti-abrasion agents to a free abrasive slurry composition as an anti-selective grinding agent for the purpose of reducing the difference in the grinding amount between materials of various hardness.

FIG. 3 shows a method of processing the thin film head 12 for enhanced protection of the read and write structures, indicated as process 60. The process 60 uses the second problem, that is, recession, to help solve the first problem of exposed materials, as will be described. FIGS. 4A–4C show the head 40 after various stages of processing by the process 60. Referring to FIGS. 3–4C, the processing includes three processing stages 62, 64, and 66. Processing stage includes lapping the TBS of the head 40 (from FIG. 2) using a controlled film recession process to produce a head 40' having recessed areas, indicated collectively by reference numeral 70, of varying depth along the TBS 18. The lapping is performed using a standard lapping system including a rotating surface plate to support the head during lapping, a mechanism for supplying free abrasive slurry to the head and a grinding mechanism that grinds the TBS of the head for a given amount of pressure. The amount of recession is monitored by determining a pole tip recession value, e.g., using a scanning probe microscope (AFM). Other monitoring includes monitoring the stripe height, for example, by monitoring GMR resistance values during lapping. The lapping process 62 includes a first phase in which the head is coarsely and quickly lapped, and a second, final phase of lapping in which the lapping is adjusted to a fine, lower rate lap to fine-tune the amount recession that occurs. The lapping is tuned to control recession to a predetermined range, which depends upon expected recording conditions. The maximum depth of recession is limited by the Wallace spacing loss (amplitude loss with frequency) at the frequencies of interest. The minimum depth would be determined by the need for the material that will later be coated into the recession (as will be described with reference to processing stage 64) to remain in sufficient thickness under recording (contact) conditions to protect the GMR element. The lapping process parameters used to control recession include, but are not limited to, diamond abrasive particle size, lapping slurry chemical composition, lapping pressure and lapping direction, in ways familiar to those skilled in the art.

During process stage 64, the recession (recessed areas) produced by the processing stage 62 is filled by coating the TBS with a material by a process such as sputtering or cathodic arc, to a depth greater than the recession to be filled. The deposited material can be a protective coating such as diamond-like carbon, which is often used as a protective layer. In the case of a thin film head, the devices are generally surrounded by alumina. Thus, alumina would be a compatible material to sputter on to the TBS. Sputtered soft magnetic material such as CoZrTa could also be used to fill the recession.

As shown in FIG. 4B, a resulting head 40" includes a coating of material, indicated by reference numeral 80, along the TBS.

Alternatively, instead of coating the entire surface, as shown in FIG. 4B, it may be desirable to coat only the GMR element itself, preferably with a magnetic material. The magnetic material could be plated by using the thin film GMR material as a plating electrode. The purpose of using a magnetic material would be both to protect the GMR element from corrosion and to form a yoke type GMR structure.

During process stage 66, material that covers the portions of the surface that do not form part of the structures of interest (areas of recession), such as the substrate and closure, is removed from the surface to achieve a near planar surface. This "excess" material can be removed with a traditional cleaning tape, or something similar. Alternatively, the unwanted material could also be removed by traditional lapping. FIG. 4C shows the head after processing stage 66, indicated as head 40'''. The coated material remains only in the recessed surface areas of the devices and, possibly, to some extent, the alumina. The remaining coating material is indicated by reference numeral 90.

Alumina recession, in areas between and far from the devices, is always less than the recession over the devices 48, 50, 52 and 56. The alumina recession is sometimes referred to as the "equilibrium recession". The recession would be filled as described above to a depth greater than the equilibrium recession. The intention in removing the material is to do no more than approach the equilibrium recession for alumina only.

While only one head 12 is shown, it should be understood that a greater number of heads can be processed simultaneously. Typically, as is well known in the art, a plurality of sliders are fabricated on a wafer and the wafer is cut into bars, with each bar including a plurality of sliders containing magnetic transducers arranged in rows. The processing of process 60 would be performed for each bar so that multiple thin film heads are processed simultaneously. Once each bar has been processed, it would then be further processed (rail etching) and cut into individual sliders in a conventional manner.

Other embodiments are within the scope of the following claims.

What is claimed is:

1. A thin film head for use in a tape drive, comprising:
   a read portion;
   a write portion;
   a GMR element disposed in the read portion;
   the read and write portions having a tape bearing surface; and
   a sensing surface of the GMR element recessed from the tape bearing surface as a result of a lapping process and coated with a material, and wherein a surface of the thin film head that is approximately non-recessed relative to the tape bearing surface is not coated.

2. The thin film head of claim 1, wherein the surface of the thin film head approximately non-recessed includes a surface of the write portion distal to the read portion.

3. The thin film head of claim 1, wherein the read portion includes shields and the write portion includes a write pole, and wherein the shields and write pole each have a surface recessed from the tape bearing surface as a result of the lapping process and coated with the material that coats the sensing surface of the GMR element.

4. The thin film head of claim 3, wherein the material is diamond-like carbon.

5. The thin film head of claim 3, wherein the material is a soft magnetic material.

6. The thin film head of claim 5, wherein the material is CoZrTa.

7. The thin film head of claim 5, wherein the material is a sputtered material.

8. The thin film head of claim 1, wherein the material is a magnetic material.

9. The thin film head of claim 8, wherein the material is a plated material.

10. The thin film head of claim 1, further comprising:
    a substrate; and
    a closure, wherein the surface of the thin film head approximately non-recessed includes a surface of the substrate and the closure proximate to the tape bearing surface.

11. A thin film head for use in a tape drive, comprising:
    a read portion having a tape bearing surface and including a sensing surface recessed relative to the tape bearing surface;
    a write portion having the tape bearing surface; and
    a coating material provided over the recessed sensing surface, wherein at least a portion of a surface of the write portion is approximately non-recessed relative to the tape bearing surface and is not coated.

12. The thin film head of claim 11, wherein the read portion includes shields and the write portion includes a write pole, and wherein each of the shields and the write pole includes a surface recessed from the tape bearing surface and is coated by the coating material.

13. The thin film head of claim 11, wherein a sensing element of the sensing surface is selected from at least one of a MR-type sensor, a GMR sensor, an AMR sensor, and a SAF GMR sensor.

14. The thin film head of claim 11, wherein a sensing element of the sensing surface is configured in one of a current-in-the-plane (CIP) mode or current-perpendicular-to-the-plane (CPP) mode.

* * * * *